United States Patent [19]
Plyler et al.

[11] 4,153,319
[45] May 8, 1979

[54] LOCKING SHIELD FOR ELECTRICAL TERMINAL

[75] Inventors: Robert G. Plyler, Vienna; George F. Seagreaves, Warren; Lyle B. Suverison, Fowler, all of Ohio

[73] Assignee: General Motors Corporation, Detroit, Mich.

[21] Appl. No.: 859,727

[22] Filed: Dec. 12, 1977

[51] Int. Cl.² .............................................. H01R 13/54
[52] U.S. Cl. ................................. 339/75 P; 339/261
[58] Field of Search ............ 339/260, 261, 212, 213 S, 339/213 T, 8 R, 8 P, 75 P

[56] References Cited
FOREIGN PATENT DOCUMENTS

| | | | |
|---|---|---|---|
| 490461 | 12/1918 | France | 339/260 |
| 252895 | 10/1948 | Switzerland | 339/260 |
| 198471 | 6/1923 | United Kingdom | 339/261 |

*Primary Examiner*—Roy Lake
*Assistant Examiner*—E. F. Desmond
*Attorney, Agent, or Firm*—Herbert Furman

[57] ABSTRACT

A locking shield for an electrical terminal includes a base wall secured to an insulator body molded about a female terminal. Wing flanges extend from the base wall about the insulator body and include overlapping apertured terminal flanges which overlie an apertured wall of the body opening to the terminal. The terminal flange apertures are normally misaligned since the wing flanges are resiliently biased apart relative to each other. When the wing flanges are manually squeezed together, the apertures are aligned so that a male terminal can be inserted therethrough into electrical engagement with the female terminal. The resilient bias of the wing flanges engages the edges of the apertures with the male terminal to lock it in place when the wing flanges are manually released.

3 Claims, 8 Drawing Figures

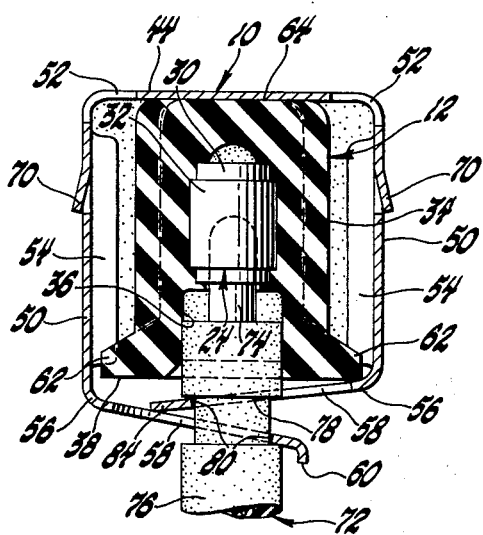
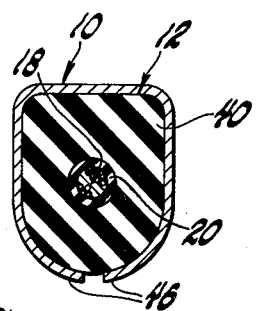
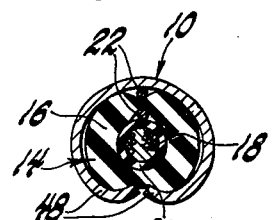
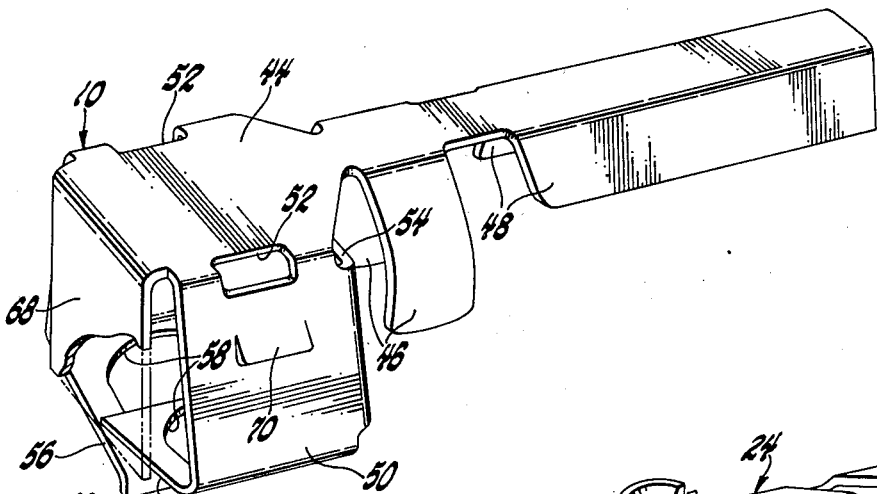
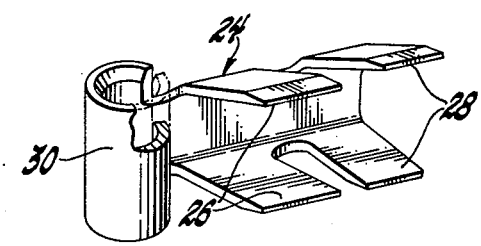

LOCKING SHIELD FOR ELECTRICAL TERMINAL

This invention relates generally to a locking shield for electrical terminals and more particularly to a manually operable locking shield for locking a pair of electrical terminals to each other.

The primary feature of this invention is that it provides an improved manually operable locking shield for releasably locking mating electrical terminals to each other. Another feature is that the locking shield is secured to an insulator body which encases one of the terminals and locks to a mating terminal received in the insulator body to thereby hold the terminals in electrical engagement. A further feature is that the locking shield includes a pair of manually operable portions which grip the mating terminal therebetween. Yet another feature is that the locking shield is secured to the conductor of the one terminal and to a leakage wire thereof to avoid electromagnetic interference. Still another feature is that the manually operable portions are apertured and resiliently biased relative to each other to normally misalign the openings, the openings being alignable to provide for insertion of the mating terminal therethrough and into engagement with the one terminal when the portions are manually squeezed, the edges of the openings gripping the mating terminal under the resilient bias of the portions when the portions are manually released.

These and other features of the invention will be readily apparent from the foregoing specification and drawings wherein:

FIG. 4 is a sectional view showing the one terminal in engagement with the other mating terminal.

FIG. 5 is a sectional view taken generally along the plane indicated by line 5—5 of FIG. 1.

FIG. 6 is a sectional view taken generally along the plane indicated by line 6—6 of FIG. 1.

FIG. 7 is a partially broken away perspective view of the locking shield before being secured to the insulator body, and FIG. 8 is a partially broken away perspective view of the one mating terminal before being secured to a conductor.

Figure 1:
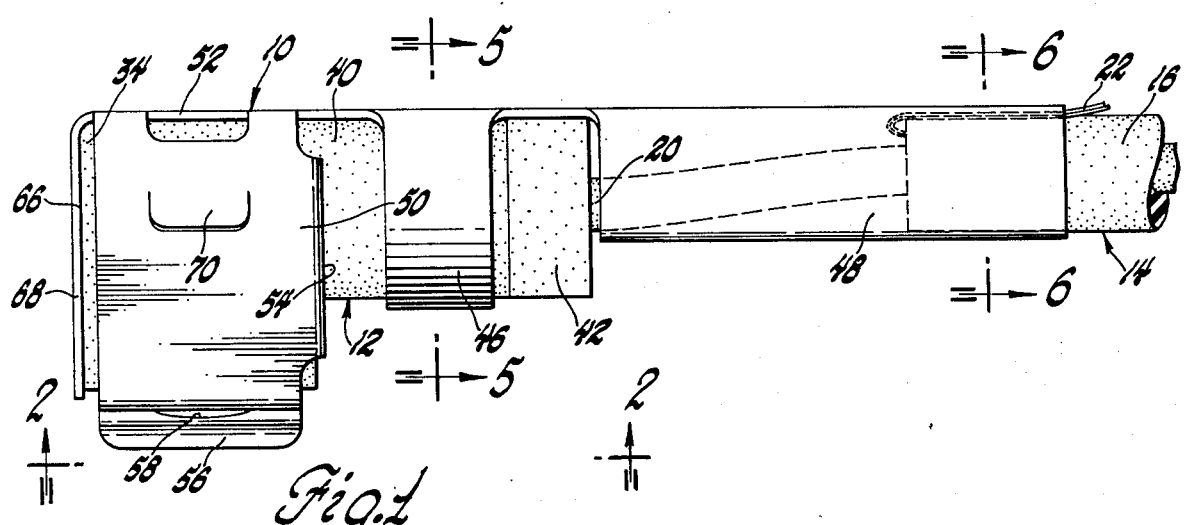
FIG. 1 is a side elevational view of a locking shield according to this invention secured to an insulator body encasing one of a pair of mating terminals.

Referring now particularly to FIG. 1 of the drawings, the locking shield 10 of this invention is shown secured to an insulator body 12 and to a conductor 14. The conductor 14, FIG. 6, includes an outer insulating jacket 16 which encases a conductor core 18 encased in an inner insulation jacket 20. Also encased within jacket 16 is an uninsulated leakage wire 22.

Figure 3:
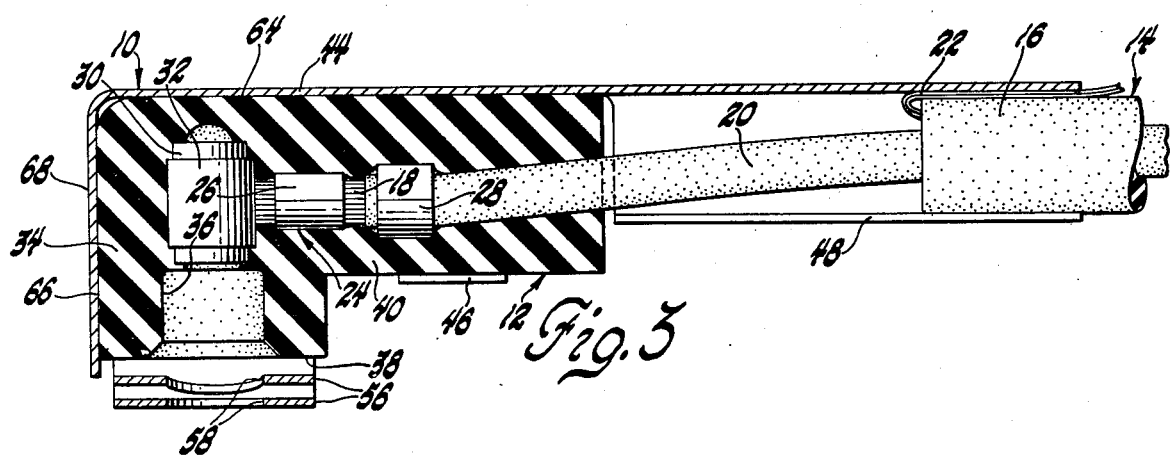
FIG. 3 is a longitudinal sectional view.

The conductor core 18 is secured within the insulator body 12 to a female terminal 24 as shown in FIGS. 3, 4 and 8. The terminal 24 is conventional and in current production and is a one piece sheet metal stamping having longitudinally spaced integral wing portions 26 and 28 which are respectively crimped over the core 18 and over the inner insulation jacket 20 of the conductor 14. The terminal 24 further includes an integral cylindrical portion 30 over which is crimped a separate cylindrical member 32.

The insulator body 12 is molded about the terminal 24 after the terminal has been crimped to core 18 and jacket 20, as shown in FIGS. 3, 4 and 5. The body 12 is of rubber and includes a main body portion 34 having a bore 36 extending inwardly from one end wall 38 thereof to the opening of the portion 30 of terminal 24. The insulator body further includes a laterally extending neck portion 40 provided with laterally extending flange portions 42 at the terminus thereof.

The locking shield 10 is a one piece sheet metal stamping which includes a base wall 44 having longitudinally spaced wing flanges 46 and 48 which are respectively crimped to the neck portion 40 of the insulator body 12 and to the terminus of the outer jacket 16 of conductor 14 to secure the locking shield to the insulator body. As shown in FIGS. 1, 3 and 6, the leakage wire 22 is bent back over the jacket 16 so as to be in electrical contact with the locking shield when the flanges 48 are crimped over the jacket 16. The flanges 46 are crimped over the neck portion 40 of the insulator body 12 adjacent the flange portions 42.

Figure 2:
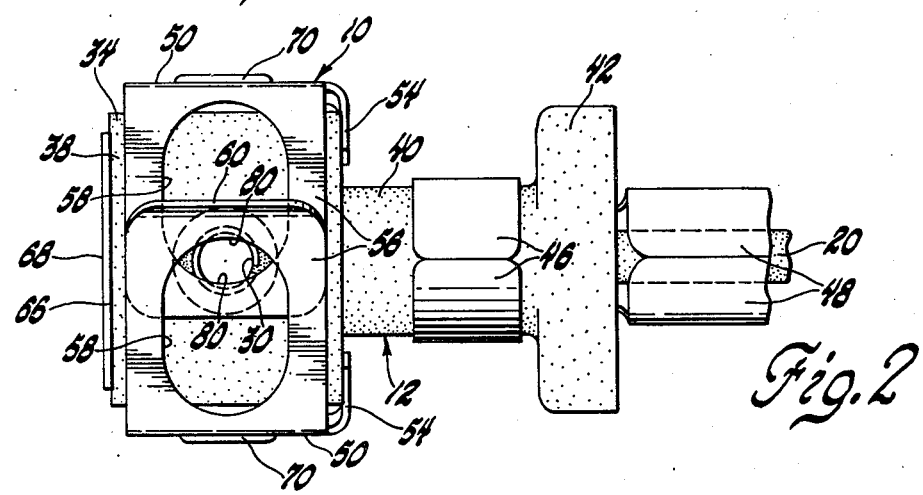
FIG. 2 is an elevational view taken generally along the plane indicated by line 2—2 of FIG. 1.

A pair of integral side walls or wing flanges 50 extend laterally from wall 44, with the junctures between the wing flanges and the wall 44 being slotted at 52 to provide for ease of bending of the wing flanges relative to this wall. Each wing flange 50 includes a first lateral flange 54 for strengthening, and a second lateral or terminal locking flange 56. The flanges 56 are generally located in overalpping relationship to each other and wall 38 as shown in FIGS. 4 and 7. Each flange 56 is provided with an elongated or oval shaped opening 58, and the outermost flange 56 has an offset edge portion 60. The flanges 50 are normally resiliently biased apart relative to each other so that the openings 58 are normally misaligned as shown in FIG. 2. The flanges 56 are offset from being normal to flanges 50 and are resiliently movable relative to flanges 50. Laterally extending flanges 62, FIG. 4, at the wall 38 of the insulator body oppose the wing flanges 50 and act as resilient stops when flanges 50 are manually squeezed together as will be further described.

The upper wall 64 and the forward wall 66 of the main body portion 34 are respectively held in tight engagement with the base wall 44 and an integral forward flange 68 of the locking shield by means of the crimped flanges 46 and 48.

Each of the flanges 50 includes a lanced lateral tab 70 to improve manual gripping of the flanges when the flanges are manually squeezed together to substantially align the openings 58.

The terminal 24 electrically mates with a male terminal 72, FIG. 4, which includes a terminal post 74 received within the portion 30 of the female terminal 24 and encased within a plastic body portion 76 provided with a peripheral groove 78. When it is desired to electrically mate the terminals 24 and 72, the flanges 50 are manually squeezed toward each other and into engagement with flanges 62 to substantially align the openings 58 so that the post 74 and body portion 76 can be inserted therethrough into portion 30 and bore 36 respectively. When the flanges 50 are manually released, the resilient biasing of these flanges apart with respect to each other brings the edges 80 of the openings into engagement with the base wall of groove 78 while the resilient movement of flanges 56 with respect to flanges 50 engages flanges 56 with respective side walls of groove 78 to lock the terminals in place.

It is believed apparent from the foregoing description that the terminals can be disengaged by manually squeezing flanges 50 to substantially align openings 58 and then withdrawing the male terminal.

Thus this invention provides an improved locking shield for an electrical connector.

I claim:

1. In combination with an electrical conductor having a terminal attached thereto and encased in an insulator body provided with a passage leading from a wall of the body to the encased terminal, a locking shield comprising, a sheet metal member having a base portion secured to the insulator body and including a pair of manually movable flanges resiliently connected thereto and encompassing the insulator body, said flanges having apertured portions overlapping each other and said passage, said flanges being normally resiliently biased to a position locating said apertures in a misaligned condition with respect to each other and said passage, said flanges being manually movable relative to each other to align said apertures and passage and allow insertion of a mating terminal therethrough into electrical engagement with the encased terminal, the resilient bias of said flanges upon manual release thereof tending to misalign said apertures and engage the edges thereof with said mating terminal to resist movement thereof out of said passage, said sheet metal member being electrically insulated from the encased terminal by said insulator body.

2. In combination with an electrical conductor having a terminal attached thereto and encased in an insulator body having a pair of side walls joined by an end wall and provided with a passage leading from the end wall to the encased terminal, a locking shield comprising, a sheet metal member having a base portion secured to the insulator body and including a pair of manually movable flanges resiliently connected thereto and respectively encompassing a side wall of the insulator body, said flanges having apertured terminal portions overlapping each other and said end wall and said passage, said flanges being resiliently biased apart and away from a respective side wall to a position locating the apertures of said terminal portion in a misaligned condition with respect to each other and said passage, said flanges being manually squeezable toward each other and a respective side wall to align said apertures and passage and allow insertion of a mating terminal therethrough into electrical engagement with the encased terminal, the resilient bias of said flanges upon manual release thereof biasing said flanges apart and engaging the edges of said apertures with said mating terminal to resist movement thereof out of said passage, said sheet metal member being electrically insulated from said embedded terminal by said insulator body.

3. In combination with an electrical conductor having a conductor core encased in an insulation jacket and a leakage wire along said jacket, a terminal attached to the core and encased in an insulator body having a pair of side walls joined by an end wall provided with a passage leading from said end wall to the encased terminal, a locking shield comprising, a sheet metal member having a base portion and an attachment portion secured to the insulator body and to the conductor in electrical engagement with the leakage wire, said base portion including a pair of manually movable integral flanges resiliently connected thereto and encompassing a respective side wall of the insulator body, said flanges having integral lateral terminal portions overlapping each other and said end wall, said terminal portions being apertured and said flanges being normally resiliently biasing said terminal portions apart to a position locating said apertures in a misaligned condition with respect to each other and said passage, said flanges being manually movable relative to each other to align said apertures and passage and allow insertion of a mating terminal therethrough into electrical engagement with the encased terminal, the resilient bias of said flanges upon manual release thereof biasing said terminal portions apart relative to each other to engage the edges of said apertures with said mating terminal and resist movement thereof out of said passage, said sheet metal member being electrically insulated from the encased terminal by said insulator body.

* * * * *